(12) United States Patent
Behrens et al.

(10) Patent No.: US 8,551,286 B2
(45) Date of Patent: Oct. 8, 2013

(54) METHOD OF MOUNTING A PRINTING PLATE TO AN IMPRESSION CYLINDER

(75) Inventors: Nicole Behrens, Hamburg (DE); Bernhard Müssig, Seevetal (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 13/361,470

(22) Filed: Jan. 30, 2012

(65) Prior Publication Data

US 2012/0138225 A1    Jun. 7, 2012

Related U.S. Application Data

(62) Division of application No. 12/190,044, filed on Aug. 12, 2008, now abandoned.

(30) Foreign Application Priority Data

Aug. 13, 2007  (DE) .................. 10 2007 038 238

(51) Int. Cl.
  *C04B 37/00* (2006.01)
  *B41J 2/16* (2006.01)
  *C09J 7/02* (2006.01)
  *B32B 27/00* (2006.01)

(52) U.S. Cl.
  USPC ............ 156/325; 156/326; 156/329; 156/334

(58) Field of Classification Search
  USPC .................... 156/60, 326, 329, 334
  See application file for complete search history.

(56) References Cited

U.S. PATENT DOCUMENTS

| | | | |
|---|---|---|---|
| 5,919,983 A | 7/1999 | Rosen et al. | |
| 6,475,324 B1 * | 11/2002 | Hartmann et al. | ............ 156/247 |
| 2003/0175497 A1 | 9/2003 | Kobe et al. | |
| 2006/0177642 A1 | 8/2006 | Tateo et al. | |
| 2007/0010616 A1 | 1/2007 | Kapur et al. | |

FOREIGN PATENT DOCUMENTS

| | | | |
|---|---|---|---|
| DE | 1569898 | * | 8/1969 |
| EP | 0 491 253 A1 | | 6/1992 |
| EP | 1 645 589 A1 | | 4/2006 |
| WO | 03 040195 A1 | | 5/2003 |
| WO | 2004 024740 A1 | | 3/2004 |
| WO | 2005 090427 A2 | | 9/2005 |

* cited by examiner

*Primary Examiner* — Michael Orlando
(74) *Attorney, Agent, or Firm* — Norris McLaughlin & Marcus PA

(57) ABSTRACT

Adhesive tape having a carrier and a layer of adhesive applied on at least one side to the carrier, the carrier having at least one foam layer composed at least in part of a polyolefin-based polymer, wherein the polyolefin-based polymer contains an ethylene multi-block copolymer in a fraction of at least 40% (w/w), the ethylene multi-block copolymer being composed of hard segment blocks, containing at least 95% (w/w) of ethylene and a comonomer, and of soft segment blocks, containing ethylene and a comonomer, the fraction of comonomer in the soft segment blocks being between 10 and 20 mol %.

10 Claims, 2 Drawing Sheets

METHOD OF MOUNTING A PRINTING PLATE TO AN IMPRESSION CYLINDER

This is a Division of Application Ser. No. 12/190,044 filed Aug. 12, 2008, claiming priority of German application 10 2007 038 238.5 filed Aug. 13, 2007, now abandoned.

The invention relates to an adhesive tape comprising a carrier and a layer of adhesive applied to at least one side, the carrier comprising at least one foam layer.

BACKGROUND OF THE INVENTION

Plate mounting tapes with foam film carriers are long-established and commercially commonplace. However, the production of mounting tapes with little fluctuation in thickness continues to be a fundamental problem, more particularly when the thickness tolerances are below ±10%. In many of the sectors in which double-sided foam adhesive tapes are employed, the printing industry being a particular example, low levels of deviation in thickness from the target figure, and low overall thicknesses, are a desideratum or a necessity. In the case of the flexographic printing process, for example, it is advantageous for the mounting of the polymer printing plate to the impression cylinder by means of a double-sided adhesive tape if that adhesive tape has a suitable resilience and low levels of fluctuation in thickness. If the resilience remains constant even under repeated compression of the foam film, then the foam film has an advantageous resilience and is preferred for use in this application. This is because it is possible in this way to achieve a considerable increase in print quality. A great problem in the production of plate mounting tapes to date has been the scant availability of foam webs possessing appropriate resilience.

When the printing operation is at an end, it must be possible to detach the adhesive tape, as far as possible without residue, both from the compression cylinder and from the plate, and this requires sufficient tensile strength. Used to date for this field of application have been adhesive tapes based on enhanced polyurethane foams (from Mayser, Lindenberg) or polyethylene copolymer foams or polyethylene-vinyl acetate copolymer foams (from Alveo, Lucerne). The PE-based foam films used possess the advantage over their aforementioned PU-based counterparts that they are obtainable with substantially lower compressive stress values. In respect of the deterioration in resilience as a result of fatigue of the material after numerous compression/recovery cycles as well, the closed-cell PE films are superior to the open-cell PU films.

A further requirement imposed on foam films used in plate mounting tapes is the temperature stability. At web speeds in flexographic printing of up to 600 m/min, the mounting tape may undergo warming to around 40 to 60° C. At 60° C., not only conventional PE foam films but also PU foam films display deterioration in resilience.

EP 0 491 253 A1 discloses a plate mounting tape with a foam film carrier material. The foam film is composed preferably of polyolefin, more particularly of polyethylene or of a polyethylene copolymer, with vinyl acetate, for example. The foam film may be oriented.

A foam web with a high fraction of polyethylene obtained from metallocene catalysis, and also an adhesive tape produced from a foam web of this kind, are described by EP 1 645 589 A1. The crosslinked foam web is produced by coextruding a thermally decomposing blowing agent and a polyolefin-based polymer in web form, crosslinking the coextruded product, and, finally, foaming it. The polymer contains at least 40% (w/w) of a polyethylene-based polymer prepared by metallocene catalysis by means of a tetravalent transition metal catalyst. A foam of EP 1 645 589 A1, despite crosslinking, and particularly at elevated temperatures, exhibits weaknesses in its resilience. A consistently high resilience, however, is a mandatory requirement in the context, for example, of use in an adhesive tape in the printing industry.

An ethylene multi-block copolymer is described by WO 2005/090427 A1. This multi-block copolymer is obtained from the polymerization of two olefins in the presence of two polymerization catalysts differing in their selectivity in respect of the two olefins, and also in the presence of a chain transfer reagent ("chain shuttling agent"). The resultant multi-block copolymer exhibits elastomeric behaviour at substantially higher temperatures than homogeneous copolymers comprising identical monomers.

WO 2005/090427 A1 also describes the production of a foam by the in-mould process from the ethylene multi-block copolymer. The product of the foaming operation is unsuitable for use as a foam film in a plate mounting tape, owing to the process and to the resultant properties. The required thickness, the low thickness tolerance, and the mechanical properties associated with the cell morphology and cell size cannot be achieved in this process. For these reasons the use of non-crosslinked polyolefin-based foam films or of foam films which have been chemically crosslinked and foamed simultaneously is not an option for plate mounting tapes.

It is an object of the invention to provide an adhesive tape which exhibits consistently high resilience at elevated temperatures and which therefore may be used more particularly as a plate mounting tape.

This object is achieved by means of an adhesive tape as described hereinbelow. The invention further relates to proposed uses of the adhesive tape of the invention.

SUMMARY OF THE INVENTION

The invention accordingly provides an adhesive tape comprising a carrier and a layer of adhesive applied on at least one side to the carrier, the carrier having at least one foam layer comprising a polyolefin-based polymer.

The polyolefin-based polymer contains an ethylene multi-block copolymer in a fraction of at least 40% (w/w), the ethylene multi-block copolymer being composed of hard segment blocks, containing at least 95% (w/w) of ethylene and a comonomer, and of soft segment blocks, containing ethylene and a comonomer, the fraction of comonomer in the soft segment blocks being between 10 and 20 mol %. The comonomers in hard segment and soft segment are chemically identical.

BRIEF DESCRIPTION OF THE DRAWINGS

The invention will now be described in greater detail with reference to the drawings, wherein.

Figure 1A:
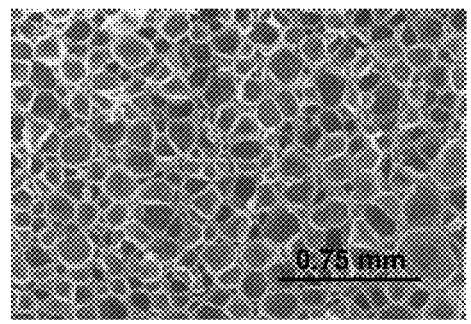
FIG. 1a depicts the size of the cells of a foam used according to the invention.

According to one first advantageous embodiment of the invention the hard segment blocks have a crystallite melting point of at least 110° C.

According to a further advantageous embodiment of the invention the ethylene multi-block copolymers are prepared by chain shuttling polymerization.

DETAILED DESCRIPTION

"Chain-shuttling polymerization" uses two different catalysts, which construct different polymer structures. A transfer of the polymer chain from one catalyst to the other produces multi-block copolymers composed of segments having differing microstructure (for example semi-crystalline (hard)/amorphous (soft)). The segments differ in their chemical structure by virtue of a high (in the hard segment) or low (in the soft segment) fraction of the polyethylene in the polymer. The comonomer, whose fraction in the soft segment is between 10 and 20 mol %, preferably between 15 and 17 mol %, is 1-octene. The use of propylene, 1-butene, 1-pentene, 4-methyl-1-pentene, 1-hexene, 1-heptene, 1-decene, vinyl acetate, 1-methylvinyl acetate and similar monomers is likewise possible. As a result of the copolymerization of the comonomer, amorphous segments of low density are obtained.

The process uses a catalyst 1 which produces, from an ethene/higher α-olefin (1-octene) mixture, a hard, semi-crystalline polyolefin, i.e. it has a high rate of incorporation for ethene and a low rate for 1-octene. Used additionally is a catalyst 2 which possesses an increased 1-octene selectivity, and from the same mixture synthesizes an amorphous soft polymer. Besides the catalysts 1 and 2 there is also a chain transfer reagent present that ensures reversible transfer of the polymer chains between the catalysts. The resulting product is the above-described multi-block copolymer with an adjustable fraction of hard segments and soft segments.

As catalyst 1 and catalyst 2 it is possible for example to use [N-(2,6-di (1-methylethyl)phenyl)amido](2-isopropylphenyl) (α-naphthalene-2-diyl(6-pyridine-2-diyl)-methane)] hafnium dimethyl and 1,2-bis(3,5-di-t-butylphenylene)(1-(N-(1-methylethyl)-imminino)methyl)(2-oxoyl)zirconium dibenzyl or [N-(2,6-di(1-methylethyl)phenyl)amido](2-isopropylphenyl)(α-naphthalene-2-diyl(6-pyridine-2-diyl) methane)]hafnium dimethyl and 1,2-bis-(3,5-di-t-butylphenylene)(1-(N-(2-methylcyclohexyl)immino)methyl)(2-oxoyl)-zirconium dibenzyl, in each case for example with diethylzinc as chain transfer reagent.

Particularly in the context of the use of adhesive tapes for bonding printing plates in the printing industry, the use is required of foam carriers having a low and precise thickness. To obtain polyolefin foams having these properties the extrusion of a foam web, its crosslinking and its subsequent foaming have proved to be particularly appropriate.

Particularly advantageous is the coextrusion of the physically crosslinked ethylene multi-block copolymer and of a chemical blowing agent to form an expandable film web, and expansion of this film web, the degree of crosslinking of the crosslinked ethylene multi-block copolymer-based foam web being 5% to 60% (w/w), preferably 5% to 40% (w/w). The degree of crosslinking of the crosslinked polyolefin-based polymer foam web is determined as follows. The weight of approximately 100 mg of a sample of the foam web is determined precisely and inserted as weight A (in mg) in the evaluation. The same sample is placed in xylene (30 ml) and stored therein at 120° C. for 24 hours. The insoluble constituents are subsequently separated off, dried and weighed. This measurement is defined as weight B (in mg). The values obtained are used to calculate the degree of crosslinking (in % (w/w)), as follows:

$$\text{degree of crosslinking} = \frac{B}{A} \cdot 100$$

Additionally appropriate is a fraction of the ethylene multi-block copolymer in the polyolefin-based polymer of the foam layer of at least 40% (w/w), preferably a fraction of at least 70% (w/w). A fraction of at least 40% (w/w) is necessary in order to be able to exploit the advantages which are achievable through the use of the multi-block copolymer. For instance, during the orientation operations that are necessary in the production process, the resilience of the multi-block copolymer means that the foam cells do not suffer permanent collapse.

According to a further advantageous development of the invention, the foam in the adhesive tape of the invention possesses a length ratio of the cells (average cell diameter in MD/average cell diameter in CD) of 0.25 to 1 and/or a length ratio of the cells (average cell diameter in CD/average cell diameter in VD) of 2 to 18. Particular preference is given to compliance with both parameters, in other words a foam having a length ratio of the cells (average cell diameter in MD/average cell diameter in CD) of 0.25 to 1 and at the same time a length ratio of the cells (average cell diameter in CD/average cell diameter in VD) of 2 to 18. In relation to these values, preference is further given to a length ratio of the cells (average cell diameter in MD/average cell diameter in CD) of 0.25 to 0.60 and/or a length ratio of the cells (average cell diameter in CD/average cell diameter in VD) of 2.5 to 15.

In this context the designation MD (machine direction) relates to the direction of extrusion of the foam web and CD (cross direction) relates to a direction orthogonal to MD and in a plane with the surface of the foam web. The designation VD (vertical direction) describes the direction orthogonal to the surface of the foam web.

The average cell diameter in MD is determined by photographing the cross-section of the foam in the plane spread from MD and VD, in 60-times magnification. The number of cells on a 15 cm line in MD (the length in the original size of the photograph is 2500 μm) is counted, and the average cell diameter is produced from the following equation:

cell diameter in $MD$ (μm)=2500 (μm)/number of cells

The procedure for determining the cell diameter in CD is similar, but must start from a cross section of the foam in the plane spread from CD and VD. And the number of the cells is counted on a line which extends in CD. The cell diameter in VD is obtained on the basis of a photograph as for the determination of the diameter in MD. Subsequently a determination is made of the number of cells along three lines in VD and of the precise length of these lines. For each individual line and for the corresponding number of cells, the cell diameter is calculated in accordance with the following equation:

cell diameter in $VD$ (μm)=line length (μm)/(60×number of cells).

The arithmetic mean of the three values obtained produces the average cell diameter in VD.

For use as carrier material in an adhesive tape preference is given, moreover, to a foam web thickness in VD between 200 and 3000 μm, more preferably between 200 and 2000 μm, and a density of 30 to 300 kg/m$^3$. Thicknesses in the lower thickness range in particular, in other words thicknesses in VD between 200 and 900 μm, can be produced very well through the use of the ethylene multi-block copolymer in conjunction with very low thickness tolerances.

The process for producing crosslinked polyolefin foam webs of low thickness of the kind needed for use as carrier material in an adhesive tape is described by way of example in the following text:

A granular mixture containing at least 40% (w/w) of an ethylene multi-block copolymer and of a thermally decomposable foaming agent is melted in an extruder and mixed. The melt is extruded in the form of a web, then crosslinked by means of ionizing radiation to a degree of crosslinking of 5% to 60% (w/w) and subsequently foamed by heating. After the foaming operation, the foam web cools down, but is then heated again until it has reached a melted or softened state. In this state, the foam web is oriented in MD, CD or both directions, to produce a length ratio of the cells (average diameter in MD/average diameter in CD) of 0.25 to 1 or a length ratio of the cells (average diameter in CD/average diameter in VD) of 2 to 18.

The thermally decomposable foaming agent may be, for example, azodicarbonamide, N,N'-dinitrosopentamethylenetetramine or p-toluenesulphonyl semicarbazide. The use of azodicarbonamide is advantageous. In order to obtain the desired degree of foaming and also suitable mechanical properties on the part of the foam, between 1 and 40 parts by weight, but better still between 1 and 30 parts by weight should be used, based on 100 parts by weight of the polyolefin-based polymer.

If necessary it is possible to add an antioxidant such as 2,6-di-t-butyl-p-cresol, for example, a foaming assistant such as zinc oxide, a nucleating agent, a thermal stabilizer, a dye, a flame retardant, a filler and/or similar additives to the granular mixture. The fractions ought preferably to be selected such that no deterioration in the mechanical properties of the foam web is observed.

Examples of crosslinking methods for the foamable polyolefin-based polymer in web form include irradiation with ionizing radiation such as, for example, electron beams, $\alpha$ rays, $\beta$ rays and $\gamma$ rays, and additionally the coextrusion of organic peroxides with the granular mixture and subsequent heating until the organic peroxide decomposes, and the like. The two methods can also be combined.

Examples of suitable organic peroxides are 1,1-bis(t-butylperoxy)-3,3,5-trimethylcyclohexane, 1,1-bis(t-butylperoxy)cyclohexane, 2,2-bis(t-butylperoxy)octane, n-butyl 4,4-bis(t-butylperoxy)valerate, di-t-butyl peroxide, t-butyl cumyl peroxide, dicumyl peroxide, $\alpha,\alpha'$-bis(t-butylperoxy-m-isopropyl)benzene, 2,5-dimethyl-2,5-di(t-butylperoxy)hexane, 2,5-dimethyl-2,5-di(t-butylperoxy)hex-3-yne, benzoyl peroxide, cumyl peroxyneodecanate, t-butyl peroxybenzoate, 2,5-dimethyl-2,5-di(benzoylperoxy)hexane, t-butyl peroxyisopropyl carbonate, t-butyl peroxyallyl carbonate and the like. The fraction of organic peroxide ought to be between 0.1 and 3 parts by weight per 100 parts by weight of the polyolefin-based polymer.

The foaming of the polyolefin-based polymer in web form may be accomplished, for example, through heating by means of hot air, IR radiation, salt bath, oil bath or the like. Combinations of these methods are also possible.

In the case of use as a carrier layer in an adhesive tape, at least one, preferably two, layers of adhesive are applied to the expanded foam film. The layer or layers of adhesive disposed on the carrier layer is or are preferably one layer or two layers of pressure-sensitive adhesive. In versions, coating with heat-activable film or reactive adhesive is also possible. For double-sided adhesive tapes it is possible for one or both of the layers to be pressure-sensitively adhesive, heat-activable or reactively adhesive.

The carrier, for adhesive tape application, is coated on one or both sides with the preferred pressure-sensitive adhesive in the form of a solution or dispersion or in 100% form (melt, for example) or by coextrusion with the carrier. An alternative possibility, but not as with conventional foam films an absolute necessity, is coating by transfer of a layer of adhesive by lamination. The advantageous heat resistance of the foam film of high multi-block copolymer fraction means that coating with adhesive can also take place directly. The adhesive layer or layers can be crosslinked by heat or high-energy rays and, where necessary, lined with a film or paper release sheet.

Adhesive tapes of particular advantage are those where the layer of adhesive, more particularly the layer of pressure-sensitive adhesive, is one based on acrylate, silicone, polyurethane and rubber (or, in the case of double-sided adhesive tapes, those in which both adhesive layers, more particularly pressure-sensitive adhesive layers, are layers based on the aforementioned compounds).

To optimize the properties it is possible with preference for the self-adhesive compound employed to have been blended with one or more additives such as tackifiers (resins), plasticizers, fillers, pigments, UV absorbers, light stabilizers, ageing inhibitors, crosslinking agents, crosslinking promoters or elastomers.

Physical pretreatment of the carrier film layer for improving the adhesion, by flame treatment or corona treatment, is advantageous.

If necessary, application of the layer of pressure-sensitive adhesive may be preceded by application—more particularly solvent-free application as by coextrusion, for example—of a primer layer, so that there is a primer layer located between the carrier film layer and the layer of pressure-sensitive adhesive.

In a further embodiment the carrier material is coated double-sidedly with a coating of pressure-sensitive adhesive. The amount of the layer of adhesive (in the case of the single-sided embodiment as well) is preferably in each case 10 to 120 g/m², preferably 25 to 100 g/m² (the amount referred to is the amount after any possible removal of water or solvent; the numerical values also correspond approximately to the thickness in μm).

The pressure-sensitive adhesive to be used for equipping one or both sides of the carrier material is more preferably a polyacrylate pressure-sensitive adhesive which comprises a polymer comprising in relation to the polymer 79% to 100% by weight of acrylic esters and/or methacrylic esters and/or their free acids with the formula $CH_2=C(R^3)(COOR^4)$, where $R^3$ is H or $CH_3$ and $R^4$ is H or alkyl chains having 1 to 30 C atoms, and 0% to 30% by weight of olefinically unsaturated monomers having functional groups, the amounts by weight being based on the polymer.

Pressure-sensitive adhesive tapes with single-sided pressure-sensitive adhesive treatment as well can be produced on the basis of a foam film. In this embodiment the side of the carrier that is not coated with adhesive can be treated with an active anti-adhesive substance.

Also embraced by the invention are adhesive tapes described in accordance with the invention that have, directly or indirectly adjacent to the carrier layer, at least one further functional layer. Examples of functional layers are layers of ink, primer or active anti-adhesive substance.

The general expression "adhesive tape" encompasses, for the purposes of this invention, all sheetlike structures such as two-dimensionally extended films or film sections, tapes with extended length and limited width, tape sections, labels, diecuts and the like.

In accordance with one further advantageous embodiment of the invention the surface of the foam layer is modified on one or both sides at least partially, preferably on both sides and fully, by plasma treatment, more particularly plasma coating, in such a way as to increase the affinity for the pressure-sensitive adhesive through an increase in the surface energy. In this case the surface energy is increased by oxygen intercalation.

Additionally the surface of the foam layer can be roughened on one or both sides at least partially, using a reagent which specifically produces an etching operation, in order to increase the surface energy of the surface. A reagent employed is trichloroacetic acid, or trichloroacetic acid in combination with inert crystalline compounds, preferably silicon compounds, more preferably $[SiO_2]_x$.

Adhesive tapes of the invention possess particular significance in the context of their use as plate mounting tapes. Since the pretreatment of the substrate to be printed and the high speeds of printing result in heating of the polymer printing plate and of the underlying adhesive tape during the printing operation, the adhesive tape employed must have a consistently high resilience even at elevated temperature. The adhesive tape of the invention is notable in particular for constant resilience on the part of the foam carrier and also for a high heat resistance.

Particularly in the case of plate mounting tapes with a foam backing, it has proved to be particularly advantageous for them to have a stabilizing film, made of polyethylene terephthalate (PET) for example, which prevents stretching and hence change in thickness of the adhesive tape during mounting and repositioning of the adhesive tape and of the plate. The stabilizing film serves, moreover, for the distribution of force during the printing operation. The stabilizing film is anchored on the foam film more particularly by way of a layer of pressure-sensitive adhesive. Since plate mounting tapes must be made double-sidedly adhesive, there is adhesive located additionally on the free sides of foam carrier and stabilizing film. Since the rear of the plate, facing the adhesive tape, is likewise composed of a PET film, it is advisable to assist the anchoring of the pressure-sensitive adhesive on the stabilizing film of the adhesive plate tape by means of a pretreatment. Only in this way is it possible to prevent with absolute certainty the transfer of the pressure-sensitive adhesive from the adhesive plate tape to the plate when the latter is being demounted. Suitable methods of pretreatment are corona pretreatment and/or a primer on the film; particularly suitable for the pretreatment is an etching operation. By means of this etching operation it is possible to obtain very good results for adhesive anchoring if use is made, as a reagent, of trichloroacetic acid ($Cl_3C$—COOH) or of trichloroacetic acid in combination with inert crystalline compounds, preferably silicon compounds, more preferably $[SiO_2]_x$. The PET film preferably has a thickness of 5 µm to 500 µm, more preferably 5 µm to 60 µm, very preferably 23 µm.

The preparation process of the PE foam films and also the properties of the end product have been found from experience to be heavily dependent on the PE raw material employed. To stabilize the foam film it is vital to crosslink the polyethylene prior to foaming, by means of UV rays for example, preferably by means of electron beams. Non-uniform crosslinking leads to fluctuations in thickness in the foamed film. Surprisingly to a person skilled in the art, following the expansion of the multi-block copolymer of the invention, the thickness is very constant, with thickness tolerances of not more than ±15%, and the surface of the foam film web is smooth. This remarkable consistency of thickness might be because of the narrow molecular weight distribution of the multi-block copolymer and because of the uniform distribution of hard and soft segments in the polymer, as a result of which the crosslinking achieved is very uniform.

Figure 1B:
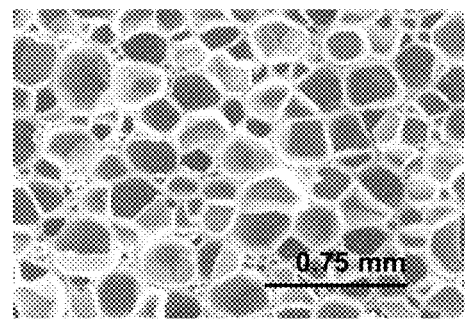
FIG. 1b depicts the size of the cells of a foam of polyethylene and EVA.

Adhesive tapes of the invention with the foam webs described, containing at least 40% (w/w) of an ethylene multi-block copolymer, surprisingly exhibit very constant resilience even after repeated loading. In terms of actual measurement, the resilience is quantified as the compressive stress to DIN 53577. To measure the compressive stress, the foam under test is compressed four times by 70% of the original thickness. The measurements at 40% compression in the first and fourth compression cycles are reported as the compressive stress of the foam film web. Good resilience in a foam results in a constant value for the compressive stress, i.e. in a small change between the values for the first and fourth cycles. Ethylene multi-block copolymer foam webs of the invention, in comparison to polyethylene-EVA foam webs with a similar compressive stress in the first cycle, possess a compressive stress in the fourth compression cycle which is higher by 30%, the foam webs being produced in a comparable process. One reason for this might be the fact that the size of the cells of a foam of the invention (see FIG. 1a) is significantly below that of a foam of polyethylene and EVA (see FIG. 1b). Especially at an elevated temperature above 50° C. the foam of the invention is significantly superior in compressive stress to the conventional foam. While the foam of polyethylene and EVA exhibits a distinct drop in compressive stress, the compressive stress of the foam of the invention remains constant up to temperatures of 100° C. On account of the property of advantageous compressive stress, adhesive tapes of the invention are highly suitable for application as plate mounting tape.

Figure 2:
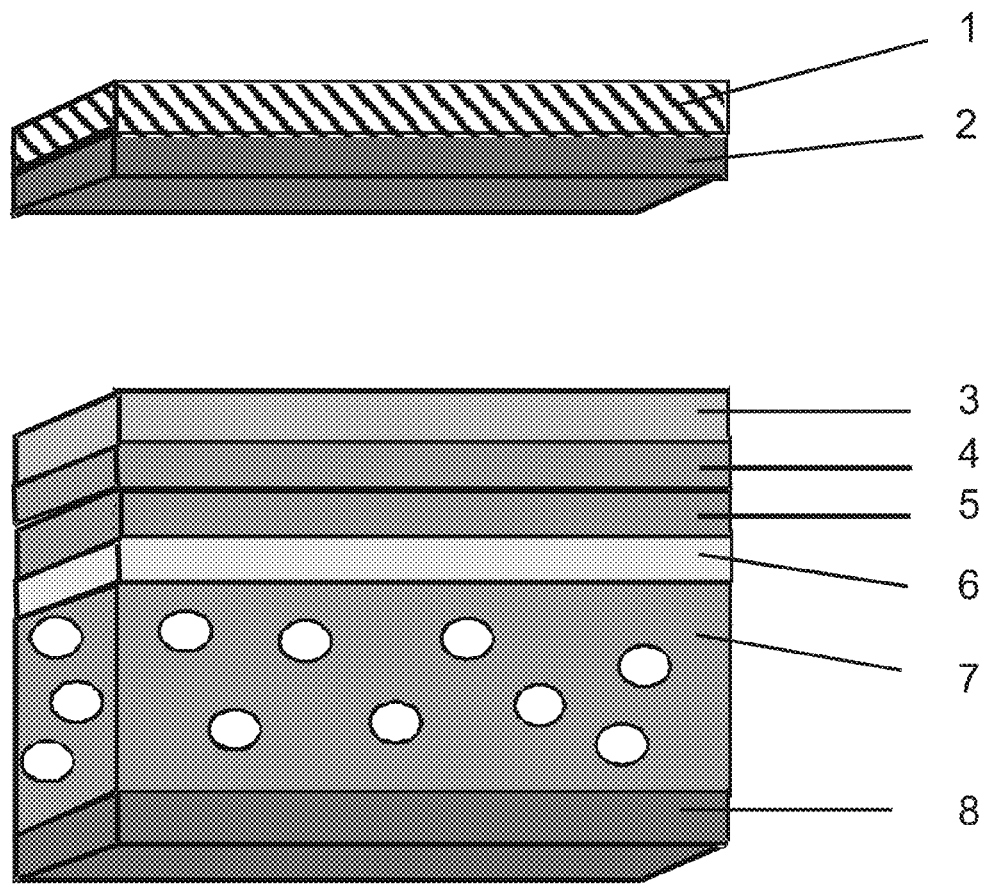
FIG. 2 shows the adhesive tape of the invention in one particularly advantageous embodiment and use.

FIG. 2 shows the adhesive tape of the invention in one particularly advantageous embodiment and use, without wishing thereby to restrict the invention unnecessarily.

The adhesive tape is used to bond a printing plate composed of a PET film 2 and a layer of a photopolymer 1. Layers 3 to 6 form a double-sidedly adhesive foam plate tape which is compressible by virtue of its foamed carrier 7. Beginning from the side by means of which the plate is adhered, the adhesive tape consists of the following individual sections:

| | |
|---|---|
| 3 | pressure-sensitive adhesive for anchoring the plate |
| 4 | a primer for improving the anchoring of the first pressure-sensitive adhesive |
| 5 | stabilizing film |
| 6 | adhesive for joining the stabilizing film to the foamed carrier |
| 7 | foamed carrier |
| 8 | pressure-sensitive adhesive for anchoring to the impression cylinder |

Furthermore, the adhesive tape might be lined on one or both sides with a liner made of paper or of a corresponding film, more particularly a double-sidedly siliconized liner, for storage and convenience of handling in use.

Test Methods

Unless indicated otherwise the measurements are conducted under test conditions of 23±1° C. and 50±5% relative humidity.

The density of the polymers is determined in accordance with ISO 1183 and expressed in g/cm3.

The crystallite melting point ($T_{cr}$) is determined by DSC in accordance with MTM 15902 (Basell method) or ISO 3146.

The thickness is determined in accordance with DIN 53370, the gauge being planar (not convex). In the case of textured films, however, the relevant thickness is the thickness prior to embossing. This thickness can also be determined subsequently via the weight per unit area (determined in accordance with DIN 53352) with conversion using the density. The embossed depth is the difference between the thicknesses with and without embossing.

The compressive stress is defined as the compression stress in N/cm² determined during the loading process in the course of a defined deformation of the foam film web. To produce a test specimen with dimensions of 50×50 mm and a minimum thickness of 25 mm, samples of the foam film web with a side length of 50×50 mm are stacked, with their edges flush to a height of 25 mm. The test specimen is compressed, using a compression testing machine, at a rate of 50 mm/min, four times by 70% of the original thickness (measurement begins when a pre-stress force of 0.1 kPa is reached). The measurements at 40% compression in the first and fourth compression cycles are reported as the compressive stress of the foam film web, The examples below are intended to illustrate the invention without restricting its scope.

EXAMPLE 1

1) Synthesis of the Catalysts for Preparing the Ethylene Multi-Block Copolymer:

[N-(2,6-Di(1-methylethyl)phenyl)amido](2-isopropylphenyl)(α-naphthalene-2-diyl(6-pyridine-2-diyl)methane)) hafnium dimethyl (catalyst 1) was prepared in accordance with WO 03/040195 A1 and WO 04/024740 A1.

Bis(1-(2-methylcyclohexypethyl)(2-oxoyl-3,5-di( t-butyl) phenyl)immino)zirconium dibenzyl (catalyst 2) was synthesized as follows:

a) Synthesis of (1-(2-methylcyclohexypethyl)(2-oxoyl-3,5-di( t-butyl)phenyl)imine 2-Methylcyclohexylamine (8.44 ml, 64.0 mmol) was dissolved in methanol (90 ml). This solution was admixed with di-t-butylsalicaldehyde (10.00 g, 42.67 mmol) and the solution was stirred for three hours and then cooled to −25° C. for 12 hours. The yellow solid formed was isolated by filtration, washed with cold methanol (2×15 ml) and then dried. The yield was 11.20 g.

b) Synthesis of bis-(1-(2-methylcyclohexypethyl)(2-oxoyl-3,5-di( t-butyl)phenyl)-immino)zirconium dibenzyl A solution of (1-(2-methylcyclohexypethyl)(2-oxoyl-3,5-di(t-butyl)phenyl)imine (7.63 g, 23.2 mmol) in toluene (200 ml) was added slowly to $Zr(CH_2Ph)_4$ (5.28 g, 11.6 mmol) in toluene (600 ml). After an hour at 25° C., toluene (680 ml) was added to give a solution with a concentration of 0.00783 M.

The co-catalyst used was a mixture of methyl-di($C_{14-18}$-alkyl)ammonium salts of tetrakis(pentafluorophenyl)borate. These salts were prepared by reacting a long-chain trialkylamine (Armeen™ M2HT, Akzo-Nobel), HCl and Li[B($C_6F_5)_4$], substantially as described in U.S. Pat. No. 5,919,983 A1, Example 2.

2) Synthesis of the Ethylene Multi-Block Copolymer

An ethylene multi-block copolymer was prepared by means of chain-shuttling polymerization as follows:

A continuous polymerization in solution was carried out in an autoclave with integrated stirring mechanism. An isoparaffinic hydrocarbon mixture (Isopar™ E from ExxonMobil), ethylene (1.22 kg/hour), 1-octene (1.63 cm³/min) and hydrogen (21.70 cm³/min) were passed into a temperature-controllable reactor (4 l). The inflow of solvent to the reactor and its internal pressure were regulatable. Additionally, catalyst 1 (0.07 kg/hour), catalyst 2 (0.06 kg/hour), cocatalyst (0.13 kg/hour) and diethylzinc (0.25 kg/hour), each in Isopar™ E, were passed into the reactor. The total throughput of Isopar™ E was 11.3 kg/hour. Reagents and catalysts were introduced in the vicinity of the reactor floor. The polymerization was carried out with the reactor completely filled, under a pressure of 3.45 MPa at 120° C., with vigorous stirring. The polymerization product was taken out through ports in the vicinity of the reactor lid. The reaction was halted by addition of a small amount of water and also stabilizers. After the end of the polymerization the reaction mixture was heated and the volatile constituents were removed. The product had a density of 0.883 g/cm³, a melting point of 121° C. and molar masses of $M_w$=118 500 g/mol and $M_n$=53 100 g/mol ($M_w/M_n$=2.2).

3) Production of the Foam Film Web

A granular mixture of 100 parts by weight of the ethylene multi-block copolymer, 5 parts by weight of azodicarbonamide, 0.3 part by weight of 2,6-di-t-butyl-p-cresole and one part by weight of zinc oxide was extruded at 150° C. to give a film web having a width of 200 mm and a thickness of 0.8 mm.

The film web was subsequently irradiated with electron beams, with a dose of 50 kGy, for the purpose of crosslinking the film web. The crosslinked film web was then guided continuously through a foaming oven in which a temperature of 250° C. had been set by means of hot air and IR heating. The prevailing temperature caused foaming of the film web to commence.

Following its emergence from the foaming oven, the foam film web was oriented in CD at temperatures between 200 and 250° C. At the same time the foam film web was also oriented in MD at a winding speed which was higher than the speed at which the film web was transported into the foaming oven (web speed). By means of the orientation in CD and MD, width, thickness, degree of expansion, and the length ratio of the cells of the foam were set as shown in Table 1.

4) Preparation of the Polyacrylate

A 2 l glass reactor conventional for free-radical polymerizations was charged with 40 g of acrylic acid, 360 g of 2-ethylhexyl acrylate and 133 g of acetone/isopropanol (96:4). After nitrogen gas had been passed through the reactor with stirring for 45 minutes, the reactor was heated to 58° C. and 0.2 g of azoisobutyronitrile (AIBN, Vazo 64™, DuPont) was added. Subsequently the external heating bath was heated to 75° C. and the reaction was carried out constantly at this external temperature. After a reaction time of 1 h a further 0.2 g of AIBN was added. After 4 h and 8 h the batch was diluted with 100 g each time of acetone/isopropanol (96:4) mixture. To reduce the residual initiators, 0.6 g each time of bis-(4-tert.-butylcyclohexanyl) peroxydicarbonate (Perkadox 16™, Akzo Nobel) was added after 8 h and after 10 h. The reaction was terminated after a reaction time of 24 h and the product was cooled to room temperature.

Subsequently the polyacrylate was blended with 0.4% by weight of aluminium(III) acetylacetonate (3% strength solution in isopropanol), diluted with isopropanol to a solids content of 30% and then coated from solution onto release paper. After drying at 90° C. for 20 minutes, the coat weight was 50 g/m².

5) Production of the Adhesive Tape

Prior to coating, the foam film web was corona-treated on both sides. The adhesive was applied to both sides of the cavitated carrier material by lamination of coated release paper. Subsequently the release paper was removed from one side again and the adhesive tape was wound up into log rolls.

EXAMPLE 2

A granular mixture of 100 parts by weight of an ethylene multi-block copolymer (Dow Chemical Company, trade name Infuse D9507), 5 parts by weight of azodicarbonamide, 0.3 part by weight of 2,6-di-t-butyl-p-cresole and one part by weight of zinc oxide was extruded at 150° C. to give a film web having a width of 200 mm and a thickness of 0.8 mm.

Subsequent operation was identical to the process in Example 1.

COMPARATIVE EXAMPLE 1

A granular mixture of 20 parts by weight of a polyethylene (sold by Sabic Europe, trade name "LDPE 2404AN00", density: 0.925 g/cm³, melting point: 107° C.) and 80 parts by weight of an ethylene-vinyl acetate copolymer (ethylene content: 18% (w/w)) along with fractions of the additives as in Example 1 was extruded at 130° C. to give a film web having the same dimensions as in Example 1.

Subsequent operation was identical to the process in Example 1.

Relevant operational parameters and also the properties of the resulting foam film web are shown in Table 1.

TABLE 1

Operational parameters and properties of the foam film webs.

|  |  | Example 1 | Example 2 | Comparative Example 1 |
|---|---|---|---|---|
| Winding speed/web speed |  | 2.50 | 2.45 | 2.15 |
| Degree of orientation | MD | 1.2 | 1.1 | 1.3 |
|  | CD | 2.0 | 2.0 | 2.4 |
| Length ratio of the | MD/CD | 0.53 | 0.50 | 0.45 |
| cells | CD/VD | 5.53 | 5.84 | 13.21 |
| Width (mm) |  | 860 | 860 | 1050 |
| Thickness (mm) |  | 0.6 | 0.6 | 0.6 |
| Degree of crosslinking (% (w/w)) |  | 25 | 24 | 25 |
| Degree of expansion |  | 4.5 | 4.4 | 4.8 |
| Compressive stress 1st cycle (N/cm²) |  | 32 ± 9 | 31 ± 8 | 31 ± 9 |
| Compressive stress 4th cycle (N/cm²) |  | 30 ± 10 | 29 ± 10 | 23 ± 8 |

As can be seen from Table 1, the compressive stress of the foam film webs comprising ethylene multi-block copolymer (Examples 1 and 2) is increased by 30% in the fourth compression cycle in relation to the webs from Comparative Example 1. This increased value is advantageous, since the drop observed in compressive stress between the 1st and 4th cycles, by 26%, for the foam film web from Comparative Example 1 is not experienced. A constant compressive stress is important for use as plate mounting tape, since it means that there is no need to modify the settings on the printing machine during printing. This makes the printers work easier. On account of the different melting points of the polyolefins (Example 1: 121° C.; Comparative Example 1: 107° C.), the compressive stress of a foam film web based on ethylene multi-block copolymer is more temperature stable, furthermore, than that of foam films comprising polyethylenes or random polyethylene copolymers or blends.

The invention claimed is:

1. A method of mounting a printing plate to an impression cylinder, said method comprising mounting said printing plate to said impression cylinder with an adhesive tape comprising a carrier and a layer of adhesive applied on at least one side of the carrier, the carrier comprising at least one foam layer comprising a polyolefin-based polymer, wherein the polyolefin-based polymer comprises 100% of an ethylene multi-block copolymer, the ethylene multi-block copolymer being composed of semi crystalline blocks, comprising at least 95% (w/w) of ethylene and a comonomer of 1-Octene, and of amorphous blocks, comprising ethylene and a comonomer, the fraction of comonomer in the amorphous blocks being between 10 and 20 mol% and the foam having a density of 30 to 300 kg/m³.

2. The method of claim 1, wherein the semi crystalline blocks have a crystallite melting point of at least 110° C.

3. The method of claim 1, wherein the ethylene multi-block copolymer is produced by chain-shuttling polymerization.

4. The method of claim 1, wherein the foam layer is produced by extruding the polyolefin-based polymer and a blowing agent to form an expandable film web and subsequently expanding this film web.

5. The method of claim 1, wherein
the polyolefin-based polymer of the foam layer is crosslinked and the degree of crosslinking of the crosslinked polyolefin-based polymer of the foam layer is 5% to 60% (w/w),
the ratio of the average cell diameter in MD/average cell diameter in CD, of the cells in the foam layer is 0.25 to 1, and/or
the ratio of average cell diameter in CD/average cell diameter in VD, of the cells in the foam layer is 2 to 18.

6. The method of claim 1, wherein the foam layer has a thickness in VD between 200 and 3000 μm.

7. The method of claim 1, wherein the layer of adhesive applied on at least one side of the carrier is a pressure-sensitive adhesive selected from the group consisting of acrylate adhesives, silicone adhesives, polyurethane adhesives and rubber adhesives.

8. The method of claim 1, wherein the layer of adhesive has a thickness of not more than 100 μm.

9. The method of claim 1, wherein the layer of pressure-sensitive adhesive is composed of a polyacrylate pressure-sensitive adhesive which comprises a polymer of (b1) 70% to 100% by weight of acrylic esters and/or methacrylic esters and/or their free acids with the formula $CH_2=C(R^3)(COOR^4)$, where $R^3$ is H or $CH_3$ and $R^4$ is H or alkyl chains having 1 to 30 C atoms, and (b2) 0% to 30% by weight of olefinically unsaturated monomers having functional groups.

10. The method of claim 1, wherein the carrier layer comprises in addition to the foam layer at least one further functional layer.

* * * * *